(12) United States Patent
Ogawa

(10) Patent No.: US 7,216,521 B2
(45) Date of Patent: May 15, 2007

(54) COMPOSITE FABRICATION FACILITY OF STEEL TUBE AND FABRICATION METHOD OF STEEL TUBE

(76) Inventor: Kiyoshi Ogawa, 95-2, Aza Mukaidate, Tomitamachi, Koriyama-shi, Fukushima 963-8041 (JP)

( * ) Notice: Subject to any disclaimer, the term of this patent is extended or adjusted under 35 U.S.C. 154(b) by 70 days.

(21) Appl. No.: 10/525,563

(22) PCT Filed: Oct. 22, 2002

(86) PCT No.: PCT/JP02/10906

§ 371 (c)(1),
(2), (4) Date: Feb. 28, 2005

(87) PCT Pub. No.: WO2004/026503

PCT Pub. Date: Apr. 1, 2004

(65) Prior Publication Data

US 2006/0162410 A1     Jul. 27, 2006

(30) Foreign Application Priority Data

Aug. 28, 2002   (JP)  ............................. 2002-248907

(51) Int. Cl.
*B21B 15/00* (2006.01)

(52) U.S. Cl. ............................. 72/125; 72/116; 72/117; 72/120

(58) Field of Classification Search .................. 72/112, 72/115, 116, 117, 118, 119, 120, 122, 123, 72/124, 125, 370.1, 370.21, 107, 110
See application file for complete search history.

(56) References Cited

U.S. PATENT DOCUMENTS 6,047,584 A * 4/2000 Filippo ........................ 72/116

6,672,123 B2 * 1/2004 Sczesny et al. ............... 72/115

FOREIGN PATENT DOCUMENTS

| EP | 0314936 | * | 7/1988 |
|---|---|---|---|
| JP | 58-077719 A | | 5/1983 |
| JP | 03-090220 A | | 4/1991 |
| JP | 04-028422 A | | 1/1992 |
| JP | 6-63651 | * | 3/1994 |
| JP | 10-146623 A | | 6/1998 |
| JP | 2002-035849 A | | 2/2002 |

* cited by examiner

Primary Examiner—Ed Tolan
(74) Attorney, Agent, or Firm—Fitch, Even, Tabin & Flannery

(57) ABSTRACT

The present invention pertains to a combined machining equipment for steel tubes, and a machining method is of a small size, can easily be moved, and is capable of not only flaring a steel tube, but also grinding a flared surface, forming a groove, and peeling off a lining. A main shaft (121) is rotatably mounted on a slide frame (141) slidable with respect to a common mount (103), and a second machining head (124) is mounted on a flange on the distal end of the main shaft (121). An auxiliary shaft (131) is slidably disposed in the main shaft (121) for rotation therewith. A first machining head (134) is mounted on a mount base (132) on the distal end of the auxiliary shaft (131). When the main shaft (121) is rotated and moved back and forth and the auxiliary shaft (131) is moved back and forth with respect to the main shaft (121), the first machining head (134) spreads the tip end of a steel tube (110) held by a steel tube holding apparatus (102) to a first position, and the second machining head (124) spreads the tip end of the steel tube (110) to a predetermined flanged position, thus flaring the tip end of the steel tube (110).

9 Claims, 13 Drawing Sheets

COMPOSITE FABRICATION FACILITY OF STEEL TUBE AND FABRICATION METHOD OF STEEL TUBE

This Application is the National Phase of International Application No. PCT/JP02/10906 filed Oct. 22, 2002, which designated the U.S. and was not published under PCT Article 21(2) in English, and this application claims, via the aforesaid International Application, the foreign priority benefit of and claims the priority from Japanese Application 2002-248907, filed Aug. 28, 2002, the complete disclosures of which are incorporated herein by reference.

TECHNICAL FIELD

The present invention relates to a combined machining equipment for steel tubes, and more particularly to a combined machining equipment for machining a joint portion of a steel tube for use in piping applications and a method of machining a steel tube.

BACKGROUND ART

Steel tubes are widely used as pipes for transporting fluid, and steel tubes that are cut to certain lengths are joined to make up a desired pipe system. According to one process of joining two steel tubes, groves are formed in ends of the steel tubes, the grooved ends are held end to end, and the outer circumferential surfaces of the joined ends are welded to each other. Alternatively, flanges or the like are welded to ends of steel tubes, providing flanged steel tubes, and the flanges are fixed to each other by bolts and nuts on site. According to still another joining process, the outer surfaces of ends of tubes are externally threaded, and are joined to each other by a sleeve coupling whose inner surface is internally threaded.

Pipings are often installed at high places. If steel tubes are welded on site, then the welding process is performed on scaffolds. Therefore, the worker needs to take improper postures to weld the entire circumferential surfaces of the tubes, tending to introduce welding irregularities and misalignments and also to cause a spark-induced risk to surroundings. For replacing pipes or changing pipe layouts, it is necessary to cut off the pipes and then weld the pipes again. Such a process is not easy to carry out.

Joining flanged steel tubes can be performed at high places relatively easily because they can be fastened together by bolts and nuts. However, because the flanges need to be welded to the steel tubes in advance, if the flanges are not welded with sufficient accuracy, then a liquid or gas leakage may occur in the piping, or the piping may not be laid in a desired layout.

According to a recent process, flanges are not directly welded to steel tubes, but loose flanges whose inner surfaces are slidable along the outer surfaces of the steel tubes are slid over the steel tubes. Thereafter, a flaring process is performed to bend ends of the steel tubes outwardly into flanges. On site, a gasket is placed between the flaring ends to be joined, and the loose flanges are fastened to each other by bolts and nuts with the flaring ends sandwiched between the loose flanges. This procedure allows the steel tubes to be joined into a piping through only a machining process without need for a welding process.

It has been customary to use a conventional machine tool to perform the flaring operation. The machine tool that has been dedicated for the flaring operation is a steel tube flanging apparatus comprising a single-stage machining head having conical rollers for spreading tube ends through a small angle and a dual-stage machining head having conical rollers for spreading tube ends through a large angle of 90°. Use of the steel tube flanging apparatus has make the flaring operation efficient.

Steel tubes for use as cold and hot water pipings have inner surfaces coated with zinc by hot dip galvanizing. When such steel tubes are flared, the zinc layer is peeled off or pressed and deformed into surface irregularities under the pressing and squeezing forces, resulting in a reduction in the sealing capability of the joined surfaces. Therefore, it has been the customary practice to forcibly remove the zinc layer with a sander or the like to provide smooth surfaces to be joined after the flaring process.

For making the above process efficient, Japanese laid-open patent publication No. H10-146623 discloses a steel tube flanging apparatus having a scraper combined with a dual-stage roller head for grinding the surfaces to be joined at the same time that the tube ends are spread through 90° by the dual-stage roller head. The disclosed steel tube flanging apparatus is effective in greatly improving the process of grinding the surfaces to be joined.

At piping construction sites, the piping plan and the actual layout details often differ from each other, making it necessary to change piping patterns Piping patterns can easily be changed if steel tubes are joined by welding on site. However, if steel tubes are joined by flanges, then they need to be returned to the machining factory where they are corrected or fabricated again. In view of this, there has been a strong demand for the flaring process to be performed on site. However, the conventional flanging apparatus for flaring steel tubes is large and heavy because it is necessary to move the single-stage machining head and the dual-stage machining head to respective positions in front of fixed steel tubes, and hence cannot easily be brought into piping construction sites.

Corrosion-resistant steel tubes have inner and outer surfaces lined with hard vinyl chloride or the like for protecting gas and water supply pipings from corrosion and stray current corrosion. For joining such corrosion-resistant steel tubes, it has been the practice to weld flanges to non-plated ends of the steel tubes and then line the inner and outer surfaces of the steel tubes and portions of the welded flanges. If the corrosion-resistant steel tubes do not match the dimensions at a piping construction site, then the corrosion-resistant steel tubes have to be processed again in the machining factory. If the piping construction site is located at a remote distance from the machining factory, the process of placing the piping has to be interrupted for a few days in order to process and deliver the steel tubes.

If steel tubes are joined by welding, then welding joints are grooved by the manufacturer and then supplied from the manufacturer. However, steel tubes themselves are supplied, not grooved, from the manufacturer, and are subsequently grooved by the user in a factory, with a large-size lathe or manually with a grinder. At a piping construction site, since steel tubes are manually grooved, a long period of time is required to machine the steel tubes and the steel tubes are liable to have an irregular finish.

To solve the above problems, Japanese laid-open patent publication No. 2002-35849 discloses a combined machining equipment for machining a steel tube, which is capable of not only flaring the steel tube, but also forming a branch tube, externally threading the steel tube, peeling a lining off the steel tube, grinding a flared surface, and grooving an end of the steel tube, and a method of machining such a steel tube. This combined machining equipment can solve many of the conventional problems. However, since this combined machining equipment is heavy and cannot easily be moved, it is not easy to use the combined machining equipment on site.

There has also been a need for the formation of flanges and conically spreading portions on ends of steel tubes for use as structural components, rather than pipings. Therefore, apparatus and methods for easily forming such flanges and conically spreading portions have also been in demand.

DISCLOSURE OF THE INVENTION

The present invention has been made in order to solve the conventional problems described above. It is an object of the present invention to provide a combined machining equipment for steel tubes which is capable of not only flaring a steel tube, but also grinding a flared surface of the steel tube, grooving an end of the steel tube, and peeling a lining off the steel tube, and which is small in size and can easily be moved.

A combined machining equipment for steel tubes according to the present invention has a steel tube machining apparatus for performing a flaring process of bending an end of a steel tube outwardly into a flange, a process of grinding a flared surface, a process of preventing a stainless steel tube from being flexed when the stainless steel tube is machined in the flaring process, a process of forming welding grooves in a steel tube, and a process of peeling off a lining, a steel tube holding apparatus having a replaceable clamp chuck for gripping the outer surface of the steel tube from opposite sides and holding the steel tube in a machining position, and a common mount.

The steel tube machining apparatus has a main shaft and an auxiliary shaft. The main shaft is rotatable and movable reciprocally, and the auxiliary shaft is disposed coaxially with the main shaft and housed in a hollow portion of the main shaft, the auxiliary shaft being fixed against rotation with respect to the main shaft and slidable axially. A flange is disposed on a distal end of the main shaft for mounting a machining head thereon, and a mount base is disposed on a distal end of the auxiliary shaft for mounting a machining head. When the auxiliary shaft is moved forwardly and rearwardly with respect to the main shaft, the steel tube can be machined by either one of the machining heads on the mount base and the flange. For example, in the flaring process, the first machining head mounted on the mount base spreads the tip end of the steel tube to a first position, and then the auxiliary shaft is retracted and the second machining head mounted on the flange of the main shaft continuously presses and deforms the tip end of the steel tube to a predetermined flanged position.

Since the machining tools can be mounted as attachments on the flange of the main shaft and the mount base of the auxiliary shaft, the flaring process, the flared surface grinding process, the stainless tube flexure preventing process, the welding groove forming process, and the process for removing lining can be performed on the steel tube by the single combined machining equipment. The combined machining equipment can select a combination of machining tools for a desired application.

The machining head on the mount base is radially movable and can be fixed in position. Therefore, steel tubes having a wide range of diameters can be machined by the single equipment.

In case of the flaring process, a flexure prevention machine head can be installed on the flange along with the second machining head, thereby a thin-walled steel tube such as a stainless steel tube can be machined.

The common mount has a front frame to which the steel tube holding apparatus is fixed, and a back frame for pressing a slide frame which holds the main shaft thereon. The front frame and the back frame are firmly fixed to each other by four side frames and two base frames. The auxiliary shaft is assembled with the main shaft rotatably assembled in the slide frame. The steel tube is pressed and deformed in the common mount that is shaped as a strong box. The combined machining equipment is simplified in structure and operation, and is small in size and weight for transportation to piping construction sites.

If a attachment for removing the lining is installed, then the lining on a lined steel tube that is mass-produced to predetermined dimensions can be peeled off, and the steel tube can be flared to dimensions on site. Then, a rust-resistant covering collar with an O-ring is set on the flared surface of the steel tube. Thus, a lined steel tube can be machined and laid as a pipe on site.

If one of the machining heads is replaced with an attachment for forming grooves in the end face of the steel tube, then welding grooves can be formed in the end face of the steel tube without the need for a large-size lathe or a manual process using a grinder.

BEST MODE FOR CARRYING OUT THE INVENTION

Embodiments of the present invention will hereinafter be described with reference to the drawings.

Figure 1:
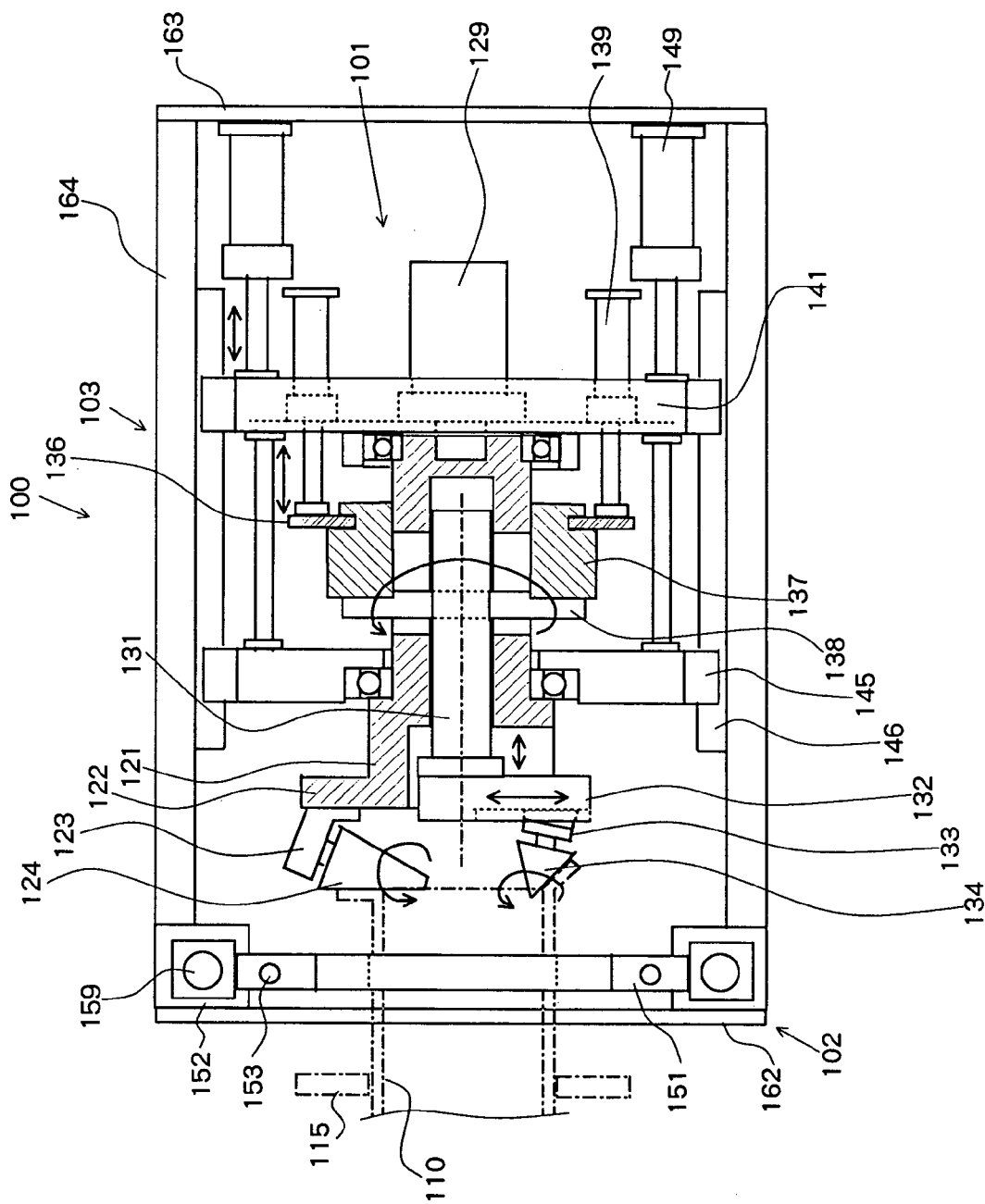
FIG. 1 is a schematic plan view, partly in cross section, illustrative of the structure of a combined machining equipment for steel tubes according to a first embodiment of the present invention.

A combined machining equipment for steel tubes according to a first embodiment of the present invention will first be described with reference FIGS. 1 through 6A–6C. The combined machining equipment for steel tubes according to the first embodiment is an equipment for flaring an end of a steel tube by bending the end outwardly. Two steel tubes thus machined can be fastened to each other by joining loose flanges whose inner surfaces are slidable along the outer surfaces of the steel tubes. As shown in FIG. 1, the combined machining equipment for steel tubes comprises steel tube machining apparatus 101 for flaring a steel tube, steel tube holding apparatus 102 for holding a steel tube to be machined in a predetermined position, and common mount 103 on which steel tube machining apparatus 101 and steel tube holding apparatus 102 are integrally mounted. The combined machining equipment for steel tubes can be carried as a unitary assembly.

Steel tube machining apparatus 101 has first machining heads 134 for spreading an end of steel tube 110 to an intermediate first flanged position and second machining heads 124 for pressing the end of the steel tube 110 which has been spread to the first flanged position to a predetermined flanged position. Steel tube holding apparatus 102 has replaceable clamp chuck 151 for gripping the outer surface of steel tube 110 from opposite sides.

Steel tube machining apparatus 101 also has main shaft 121 for actuating second machining heads 124, auxiliary shaft 131 for actuating first machining heads 134, and slide frame 141 holding main shaft 121 and auxiliary shaft 131 and slidable along the central axis of the main shaft.

Main shaft 121 is in the form of a cylindrical tube and has flange 122 on its front end which supports thereon second machining head units 123 with second machining heads 124 mounted thereon. Main shaft 121 has a rear end coupled to the rotational shaft of drive motor 129, so that main shaft 121 can be rotated by drive motor 129. In the present embodiment, drive motor 129 comprises an electric motor having a speed reducer mechanism.

Auxiliary shaft 131 has mount base 132 on its front end which supports thereon first machining head units 133 With first machining heads 134 mounted thereon, for sliding movement in directions perpendicular to the central axis of main shaft 121. Auxiliary shaft 131 is fitted in an inner bore of main shaft 121 and an inner surface of flange 122. Auxiliary shaft 131 is slidable along the central axis of main shaft 121, but is fixed against rotation with respect to main shaft 121. Cotter 138 is held by a diametrical through hole defined in auxiliary shaft 131 and extends through a groove that is defined in main shaft 121 and extends axially thereof. Cotter 138 is fixed to cotter slide unit 137 slidably mounted on main shaft 121. Cotter slide unit 137 is slidably rotatable and held in engagement with nonrotatable pressure frame 136. Third hydraulic cylinders 139 have respective ends fixed to slide frame 141 and also have respective piston rots secured to pressure frame 136. When third hydraulic cylinders 139 are actuated, auxiliary shaft 131 slides back and forth with respect to main shaft 121 that is fixed to slide frame 141 against back-and-forth movement. Auxiliary shaft 131 is fixed against rotation with respect to main shaft 121 by mount base 131 fitted in flange 122 and cotter 138. When auxiliary shaft 131 moves axially with respect to main shaft 121, the relative positions of first machining heads 134 and second machining heads 124 change in the axial direction of main shaft 121.

Figure 3:
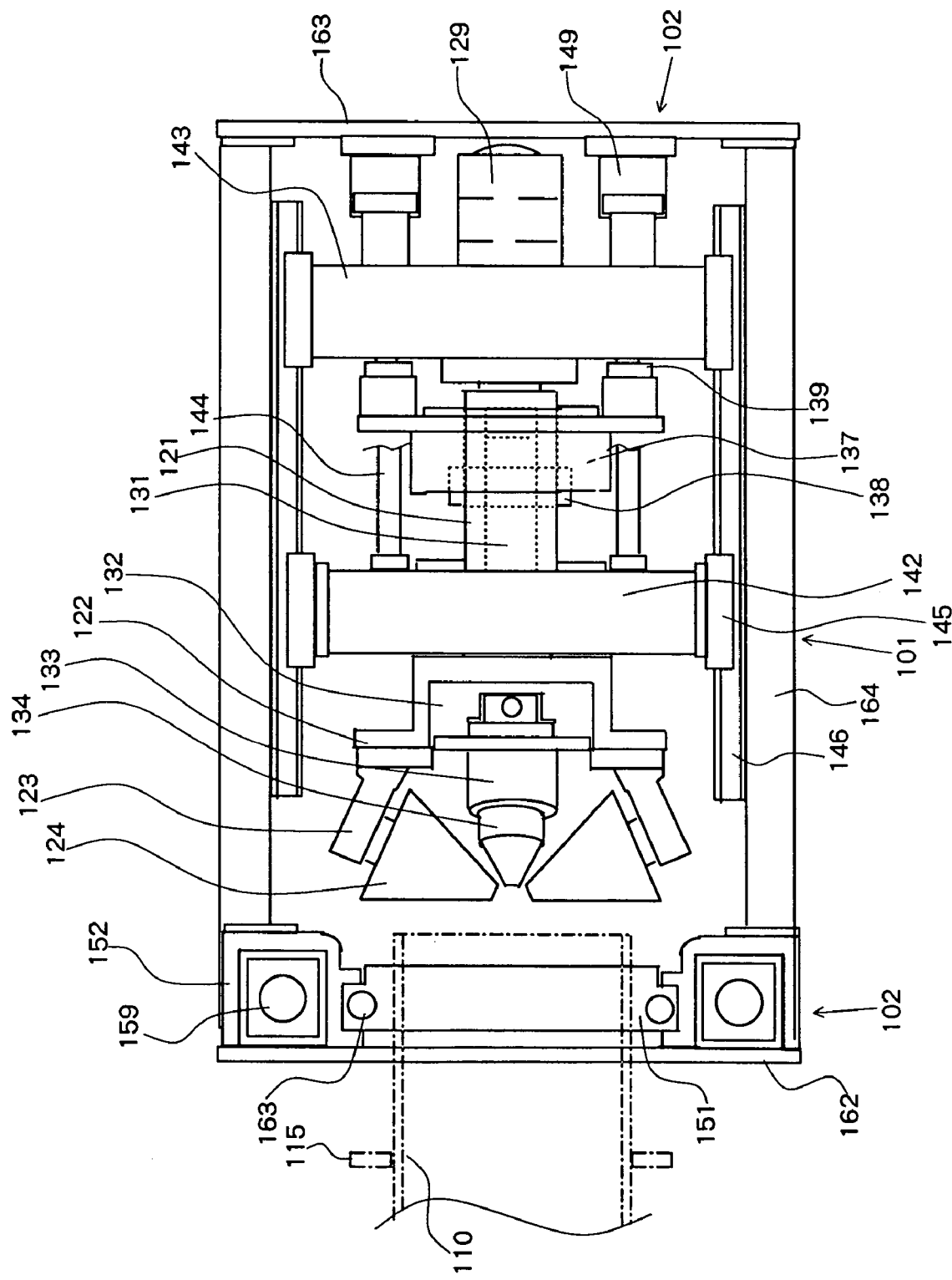
FIG. 3 is a schematic plan view of the combined machining equipment for steel tubes according to the first embodiment of the present invention.

As shown in FIG. 3, slide frame 141 has front slide frame 142, back slide frame 143, and tie rods 144 connecting these frames to each other. Main shaft 121 is rotatably supported by first main bearing 147 mounted in front slide frame 142 and second main bearing 148 mounted on back slide frame 143. The ends of third hydraulic cylinders 139 for moving auxiliary shaft 131 slidably with respect to main shaft 121 and a frame of drive motor 129 are fixed to back slide frame 143. The drive shaft of drive motor 129 is fixedly mounted in an axial hole defined in the rear end of main shaft 121. Sliders 145 are mounted on both sides of frames 142, 143 and held in engagement with guide rails 146 disposed on common mount 103 for allowing main shaft 121 to slide axially with respect to common mount 103.

Common mount 103 has front frame 162, back frame 163, side frames 164, and base frames 165. Front frame 162 and back frame 163 are firmly connected to each other by left and right pairs of two side frames 165 and two base frames 165. Steel tube holding apparatus 102 to which clamp chuck 151 can be secured by first hydraulic cylinders 159 is fixed to front frame 162. Side frames 164 on the opposite sides support guide rails 146 engaged by sliders 145 of slide frame 141. Second hydraulic cylinders 149 have front ends fixed to slide frame 141 for sliding slide frame 141 and rear ends fixed to back frame 163. Motor 166, hydraulic unit 167, and control console 168 are mounted on base frames 165.

Figure 2:
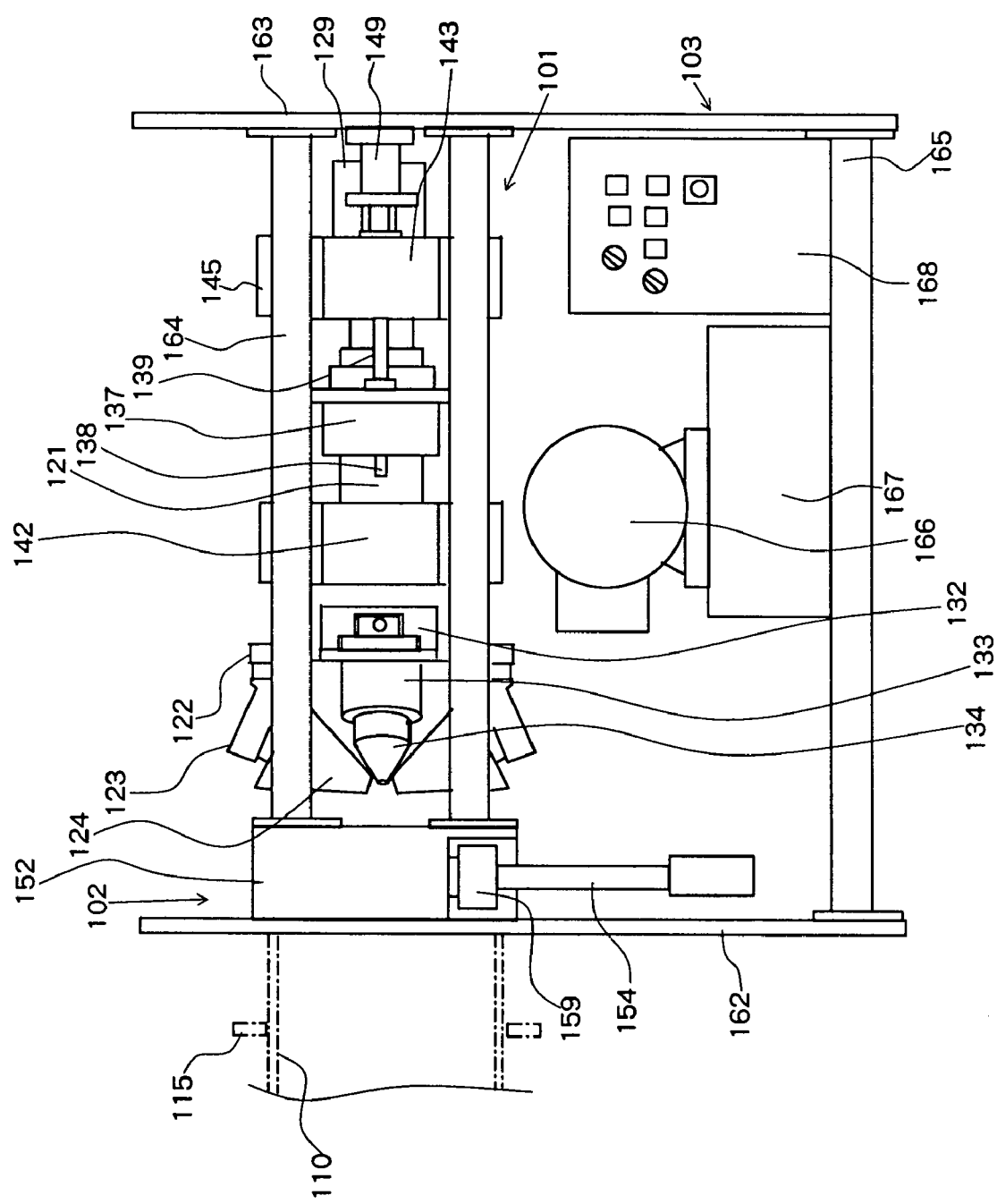
FIG. 2 is a schematic side elevational view of the combined machining equipment for steel tubes according to the first embodiment of the present invention.

Motor 166 shown in FIG. 2 actuates a hydraulic pump (not shown) of hydraulic unit 167 to generate a hydraulic pressure for actuating first hydraulic cylinders 159, second hydraulic cylinders 149, and third hydraulic cylinders 139. Control console 168 houses therein devices and control software for controlling combined machining equipment 100 for steel tubes, and cooperates With detectors such as external limit switches, etc. (not shown) in automatically controlling the various apparatus of combined machining equipment 100 for steel tubes. Though drive motor 129 is described as an electric motor having a speed reducer mechanism, drive motor 129 is not limited to an electric motor having a speed reducer mechanism, but may be a hydraulic drive motor actuatable by a hydraulic pressure. The hydraulic cylinders may be replaced with electric actuators with a sliding function. Electric actuators are capable of easily controlling axial positions. Electric motors and electric actuators may be combined to make it possible to operate the equipment free of hydraulic pressures.

Each first machining head 134 comprises a conical roller freely rotatable about its own central axis. First machining head 134 is mounted on first machining head unit 133 so as to have its central axis tilted on a plane including the axis of main shaft 121 such that the outer generator on the conical surface thereof which is held in contact with the end face of steel tube 110 is kept at an angle corresponding to the intermediate first flanged position. First machining head unit 133 is mounted on mount base 132 of auxiliary shaft 131 for sliding movement perpendicular to the axis of main shaft 121 such that the generator on the conical surface of first machining head 134 can move diametrically with respect to the end face of steel tube 110 having a diameter in a predetermined range which can be held by steel tube holding apparatus 102. First machining head unit 133 can be set in a desired position by turning machining head slide screw 171 on mount base 132 which is threaded in slide screw nut 172 on the lower surface of first machining head unit 133, and fixed in that position by fixing screws 173. After first machining head unit 133 is fixed in the given position, first machining head unit 133 spreads the tip end of steel tube 110 held in contact therewith to an angle corresponding to the first position upon forward movement and rotation of main shaft 121 through auxiliary shaft 131.

Each second machining head 124 comprises a conical roller freely rotatable about its own central axis. The outer generator on the conical surface of second machining head 124 which is held in contact with the end face of steel tube 110 has a length required for the machining of the end of steel tube 110 having a diameter in a predetermined range which can be held by steel tube holding apparatus 102. Second machining head 124 is mounted on second machining head unit 123 so as to have its central axis tilted on a plane including the axis of main shaft 121 such that the outer generator on the conical surface thereof which is held in contact with the end face of steel tube 110 is perpendicular to the axis of main shaft 121. Second machining head unit 123 is mounted on flange 122 of main shaft 121, and presses and deforms the tip end of steel tube 110 held in contact therewith to the predetermined flanged position upon forward movement and rotation of main shaft 121.

First machining head units 133 are illustrated as being provided in a pair and second machining head units 123 are also illustrated as being provided in a pair. However, they are not limited to being provided in a pair each, but may be provided as a single unit each to serve their own purposes.

As shown in FIG. 2, main shaft 121 and drive motor 129 are held on slide frame 141, and main shaft 121 is rotatably held on slide frame 141 by the two bearings, i.e., first main bearing 147 disposed in front slide frame 142 and second main bearing 148 disposed in back slide frame 143. Sliders 145 on the left and right sides of front slide frame 142 and back slide frame 143 are slidably held in engagement with guide rails 146 mounted on side frames 164 on both sides of common mount 103. Thus, main shaft 121 held on slide frame 141, auxiliary shaft 131 slidably engaging main shaft 121, and drive motor 129 are movable in the axial directions of main shaft 121.

Main shaft 121 is axially moved by second hydraulic cylinders 149 through slide frame 141. Auxiliary shaft 131 is moved by third hydraulic cylinders 139 through cotter 138 fixed to auxiliary shaft 131 and extending through the groove in main shaft 121, cotter slide unit 137 is fixed to cotter 138, and nonrotatable pressure frame 136 is movable in the axial directions of main shaft 121 while being held in sliding engagement with cotter slide unit 137.

Figure 4:
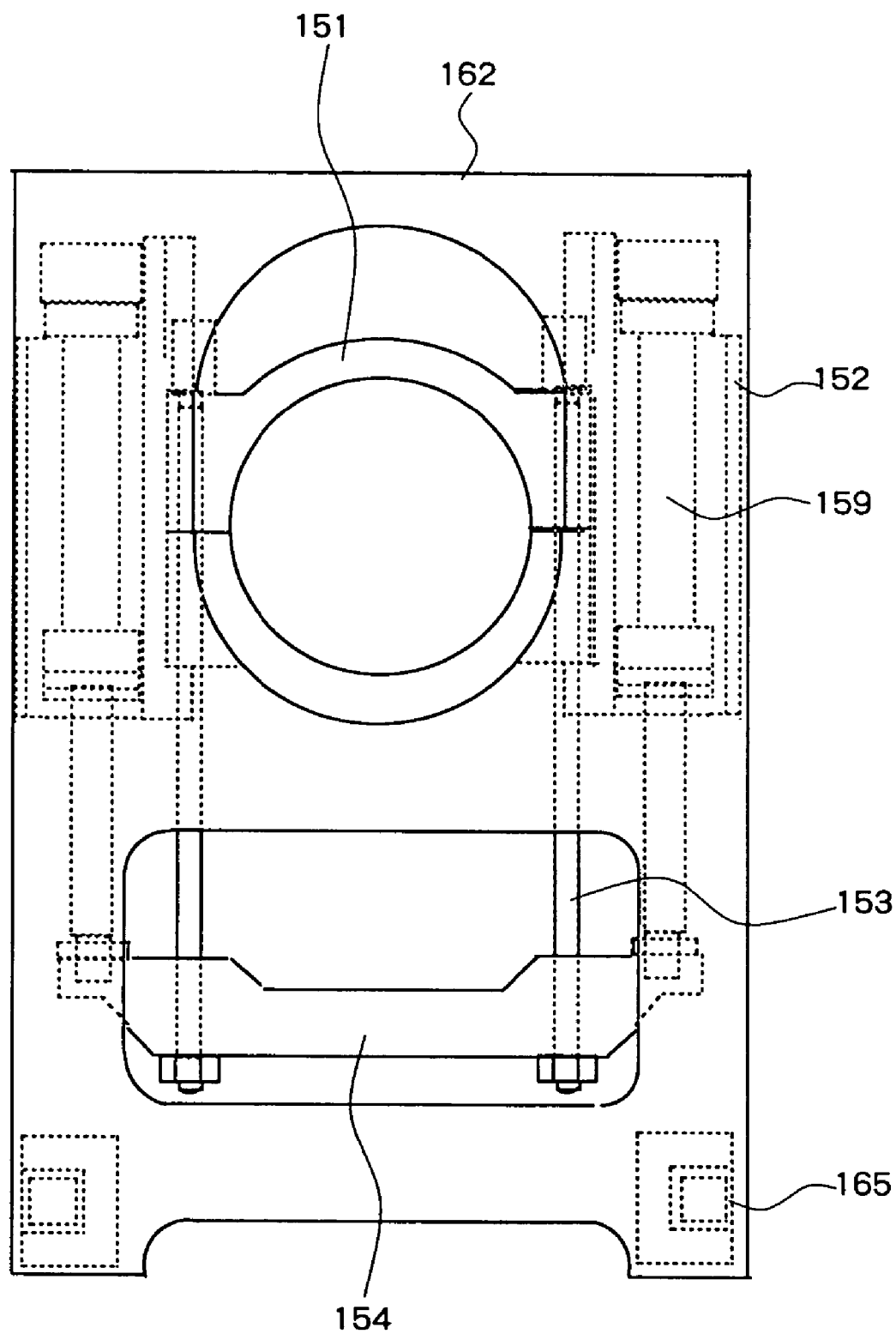
FIG. 4 is a schematic front elevational view of the combined machining equipment for steel tubes according to the first embodiment of the present invention.
Figure 5:
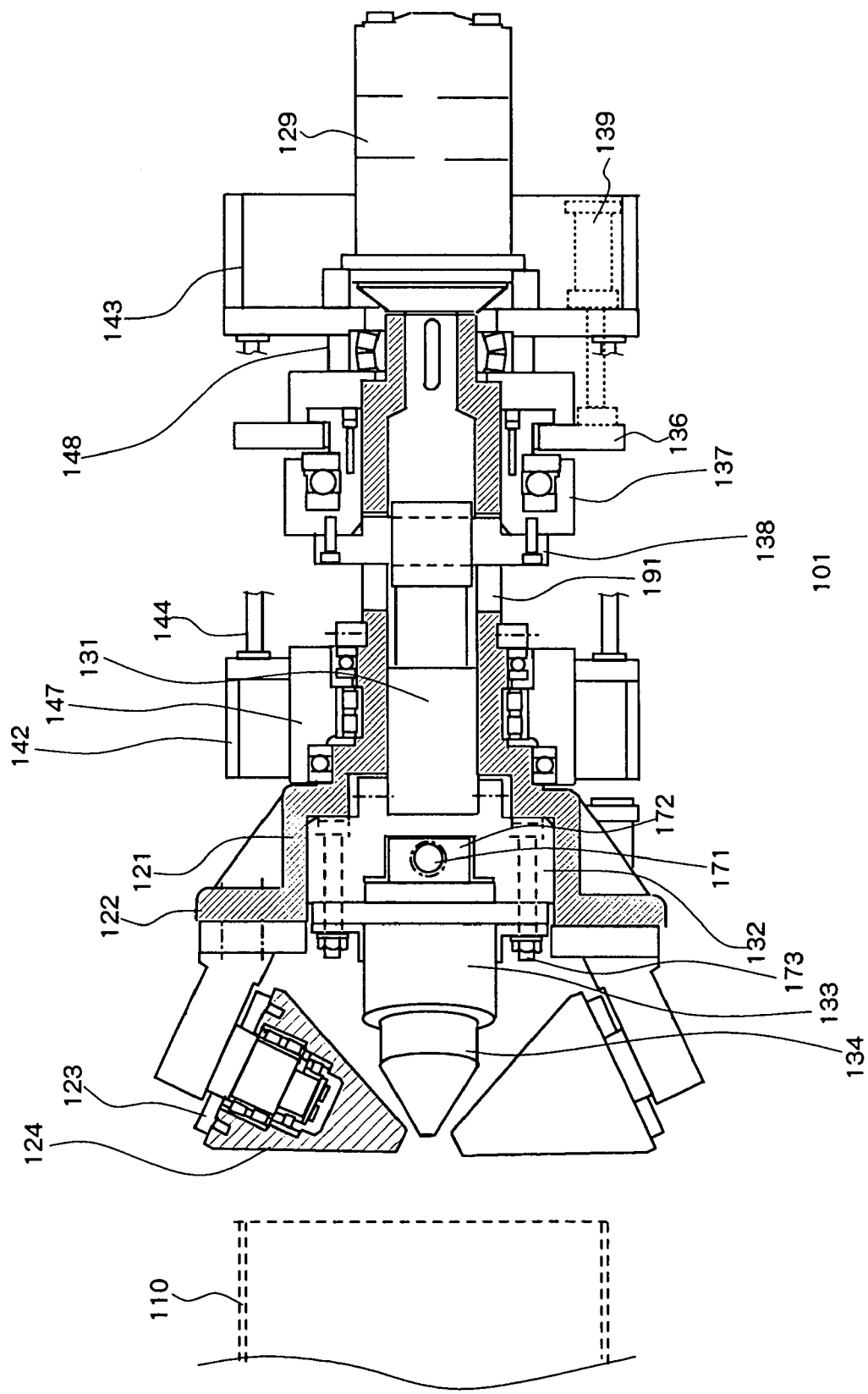
FIG. 5 is a schematic plan view, partly in cross section, of a steel tube machining apparatus of the combined machining equipment for steel tubes according to the first embodiment of the present invention.
Figure 6A:
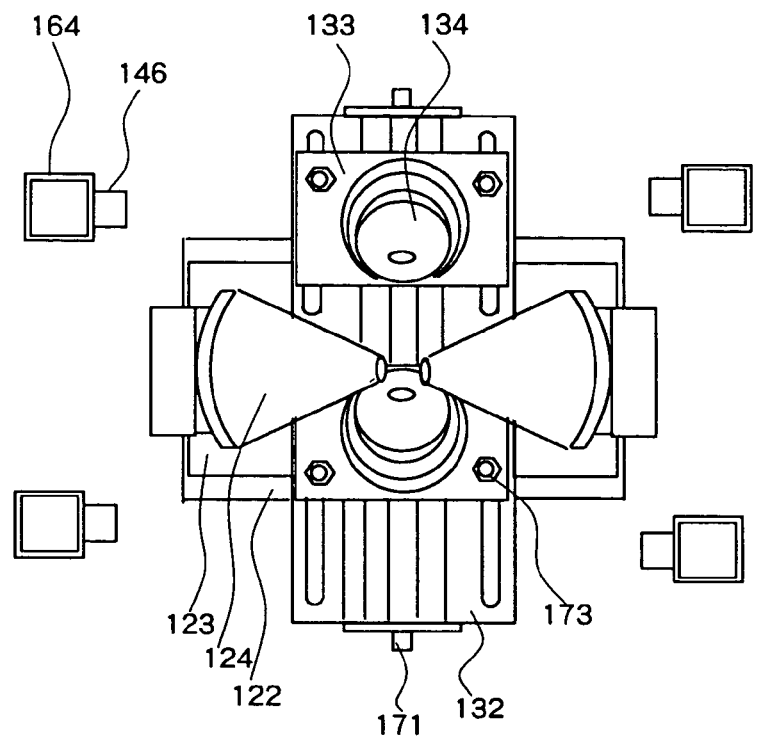
FIGS. 6A and 6B are schematic views of a machining assembly of the steel tube machining apparatus shown in FIG. 5, FIG. 6A being a front elevational view of the machining assembly, and FIG. 6B a plan view of the machining assembly.
Figure 6B:
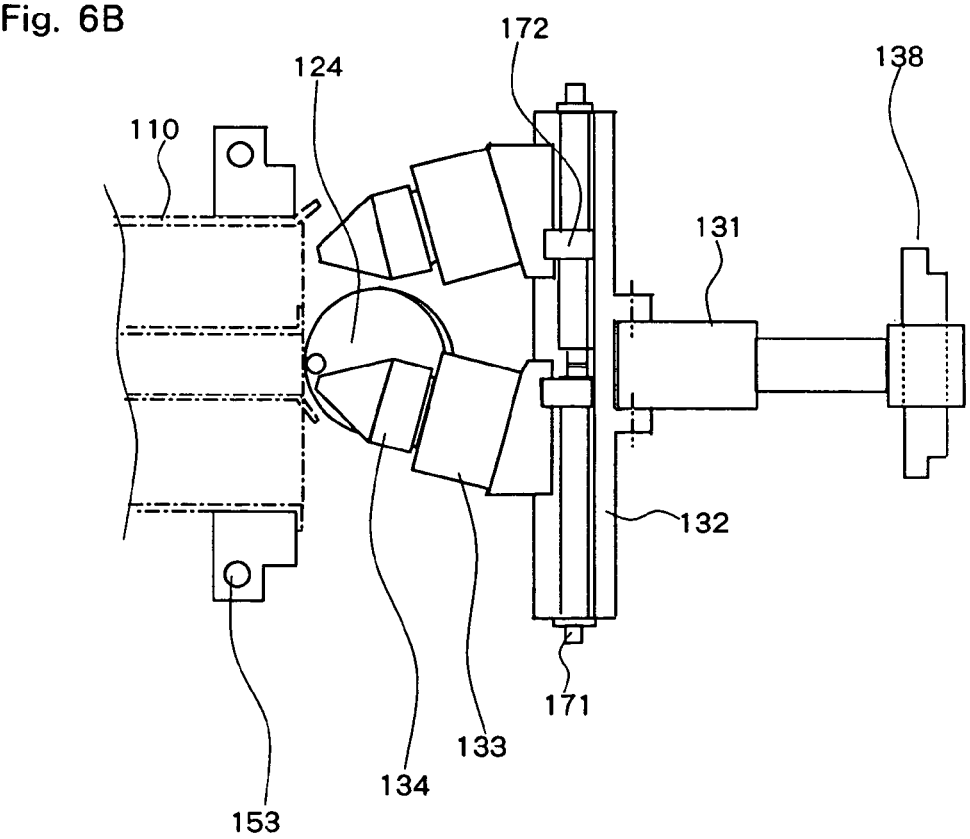

As shown in FIG. 4, steel tube holding apparatus 102 comprises clamp chuck 151 for gripping the outer surface of steel tube 110 from opposite sides, tightening rods 153 supporting and securing clamp chuck 151 for holding steel tube 110 in a predetermined position, clamp beam 154 fixed to left and right tightening rods 153, and first hydraulic cylinders 159 for moving clamp beam 154 between a tightening position and an open position. Clamp chuck 151 can be replaced with another clamp chuck depending on the outside diameter of steel tube 110 to be machined.

The hydraulic cylinders are supplied with hydraulic pressure from hydraulic unit 167 and controlled according to an operation sequence of control console 168.

As shown in FIG. 3, guide rails 146 mounted on common mount 103 are held in sliding engagement with sliders 145 mounted on slide frame 141. Thus, slide frame 141, main shaft 121 held on slide frame 141, auxiliary shaft 131 engaging main shaft 121, and drive motor 129 are slidably held on common mount 103 for sliding movement in the axial directions of main shaft 121. Back frame 163, to which are fixed the other ends of second hydraulic cylinders 149 whose one ends are fixed to back slide frame 143, and clamp chuck guides 152 of steel tube holding apparatus 102 are firmly connected to each other by side frames 164 and base frames 165, thereby preventing steel tube 110 from being released under forces that are applied from the machining heads to steel tube 110 upon forward movement of main shaft 121.

A flaring process that is performed using the combined machining equipment for steel tubes according to the first embodiment of the present invention will be described below with reference to the drawings.

First, clamp chuck 151 that matches the dimensions of steel tube 110 to be machined is installed on steel tube holding apparatus 102.

With auxiliary shaft 131 fully retracted with respect to main shaft 121, slide screw nuts 172 on the lower surface of first machining head units 133 are moved by slide screws 171 on first machining head mount base 132. First machining heads 134 are set to a position corresponding to the diameter of steel tube 110, and then fixed in that position by fixing screws 173 (see FIGS. 6A and 6B).

Main shaft 121 is moved forwardly to a predetermined machining start position, and steel tube 110 is inserted into clamp chuck 151. When the tip end of steel tube 110 is brought into contact with second machining heads 124, first hydraulic cylinders 159 are actuated to fasten steel tube 110 to clamp chuck 151.

Main shaft 121 is retracted, and auxiliary shaft 131 is moved forwardly to its foremost position with respect to main shaft 121. Then, main shaft 121 is rotated and gradually moved forwardly to bring first machining heads 134 into contact with the tip end of steel tube 110, thereby spreading the end of steel tube 110 outwardly. When the spreading of the end of steel tube 110 to a predetermined position is finished, auxiliary shaft 131 is retracted with respect to main shaft 121. Main shaft 121 is moved forwardly while in rotation, bringing second machining heads 124 into contact with the tip end of steel tube 110. Second machining heads 124 spread the end of steel tube 110 to a flanged position perpendicular to the axis of main shaft 121, whereupon the flaring process is finished.

Main shaft 121 is stopped from rotating and then retracted. Clamp chuck 151 is opened, and machined steel tube 110 is removed from steel tube holding apparatus 102, whereupon the machining operation is put to an end.

The machining operation can be performed automatically by a program set in control console 168 in combination with position detecting switches.

Figure 11:
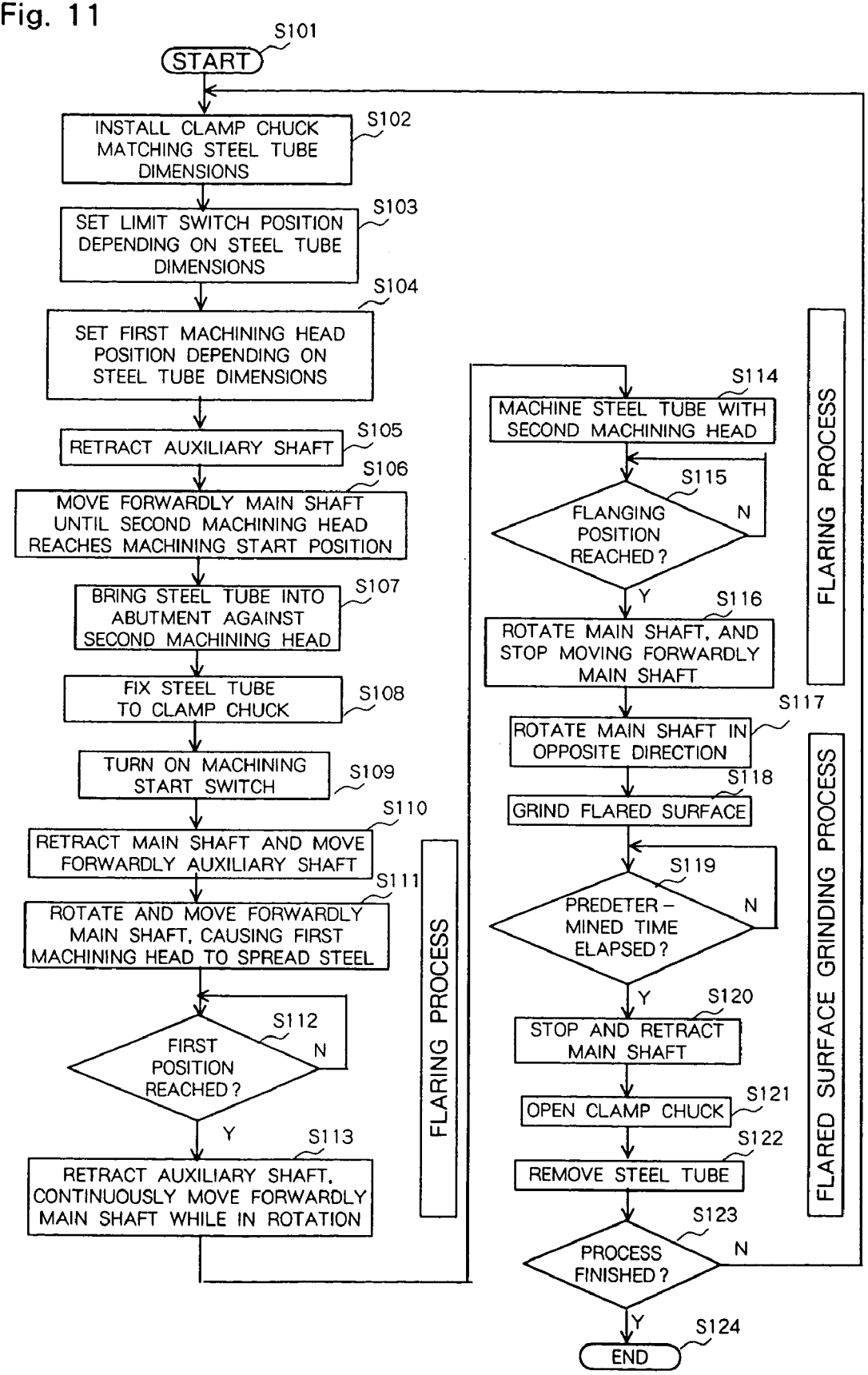
FIG. 11 is a flowchart of an operation sequence of a steel tube machining apparatus of a combined machining equipment for steel tubes according to a first and a second embodiments of the present invention.

The flaring process will be described in detail in combination with a flared surface grinding step with reference to a flowchart of FIG. 11 according to a second embodiment to be described below.

Figure 7:
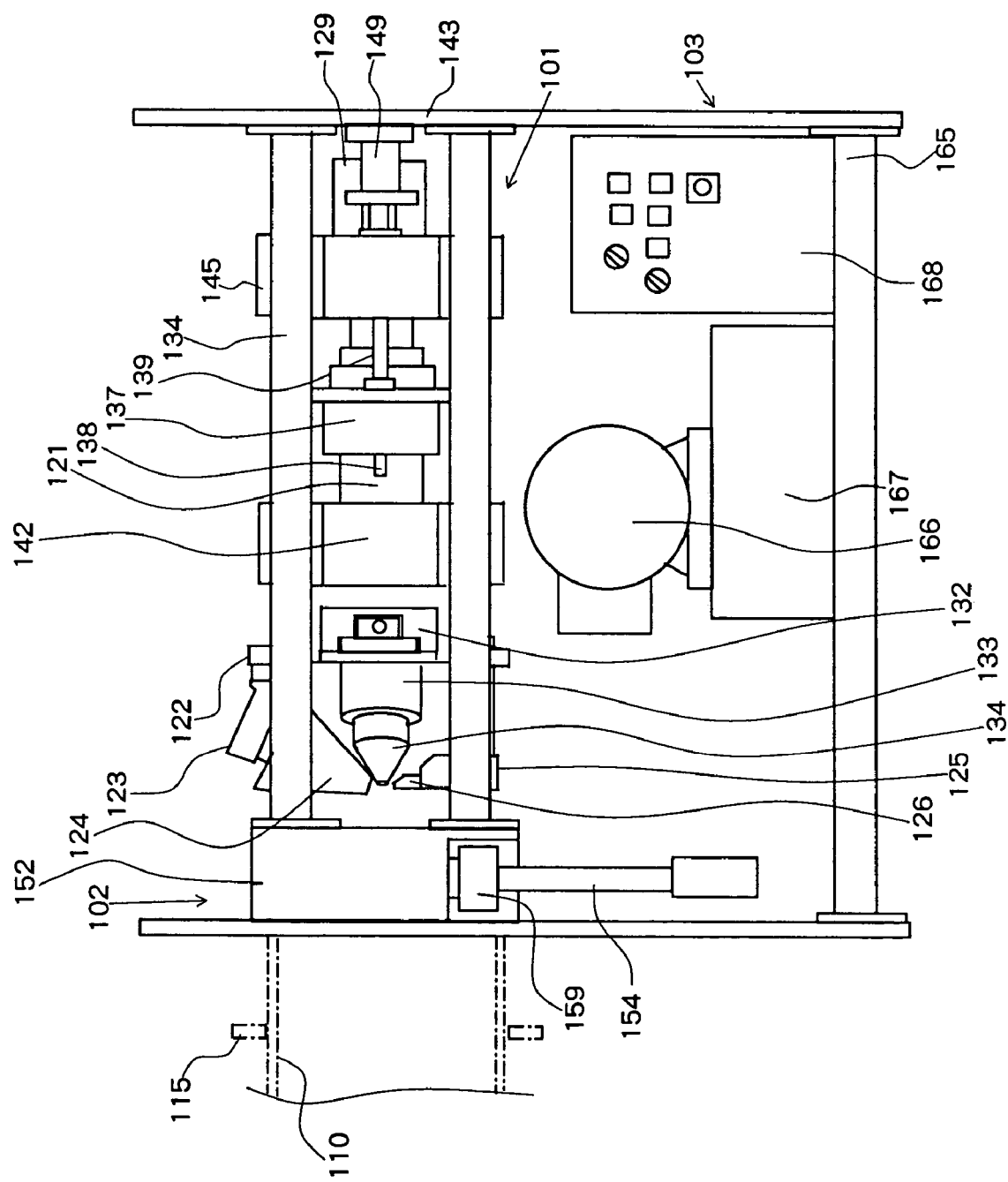
FIG. 7 is a schematic side elevational view of a combined machining equipment for steel tubes according to a second embodiment of the present invention.
Figure 10A:
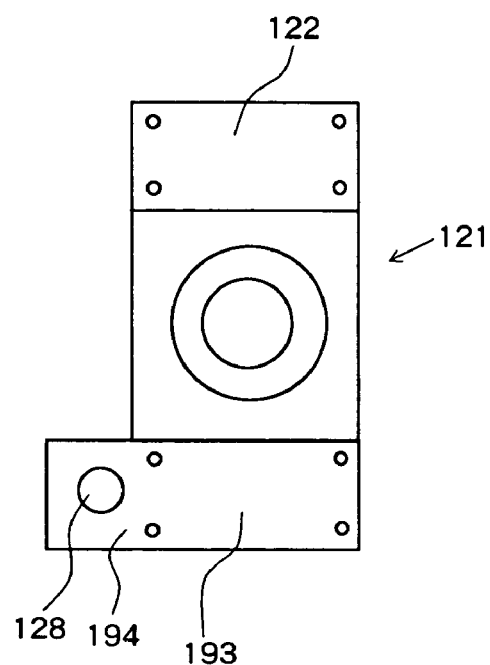
FIGS. 10A through C are schematic views of a main shaft, FIG. 10A being a front elevational view of the main shaft, FIG. 10B a side elevational view of the main shaft, and FIG. 10C a bottom view of the main shaft.

A combined machining equipment for steel tubes according to a second embodiment of the present invention will be described below with reference to FIGS. 7, 10A through to 10C. According to the second embodiment, a flared surface grinding unit is added as an attachment to the first embodiment.

Figure 8:
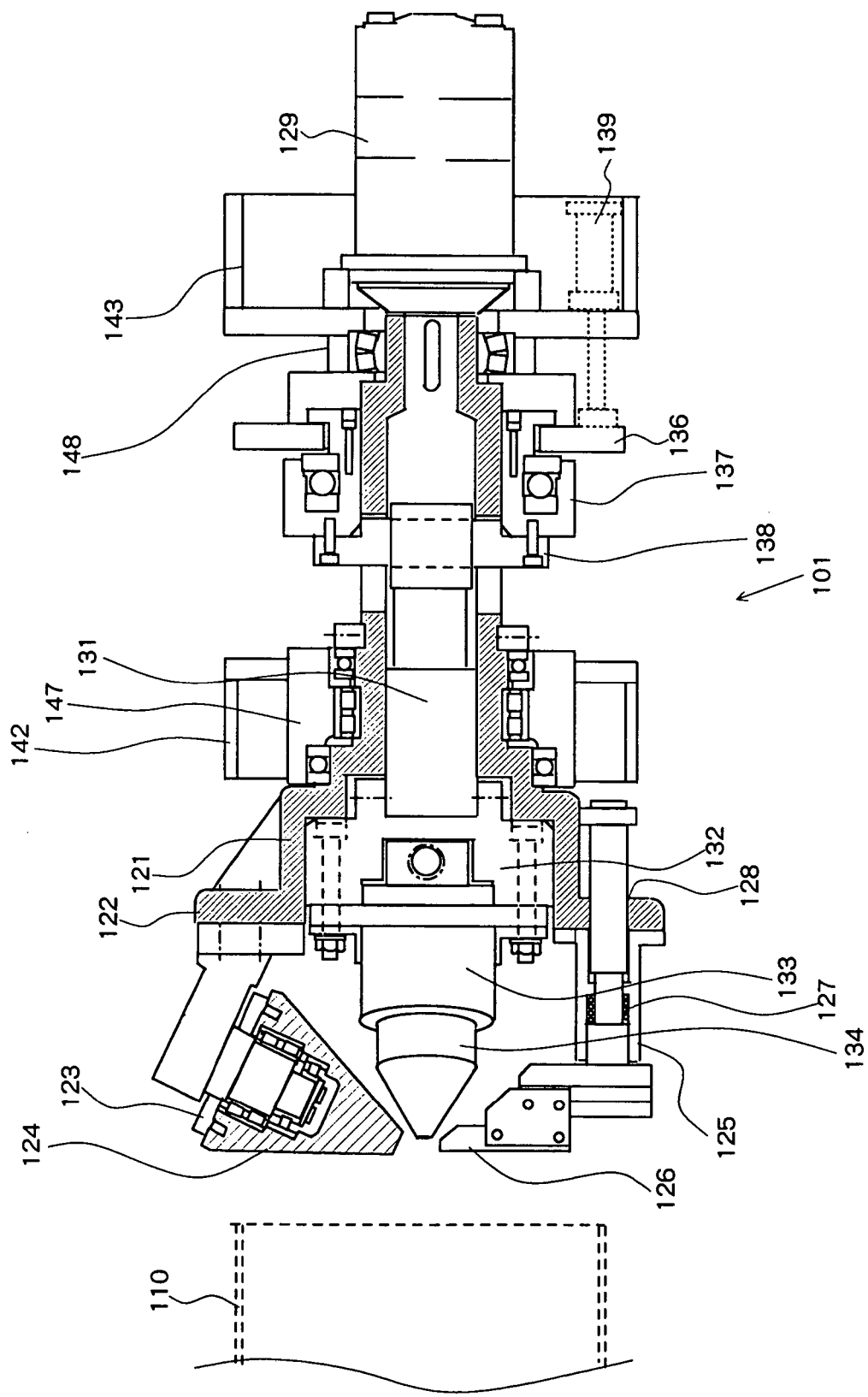
FIG. 8 is a schematic plan view, partly in cross section, of a steel tube machining apparatus of the combined machining equipment for steel tubes according to the second embodiment of the present invention.
Figure 9:
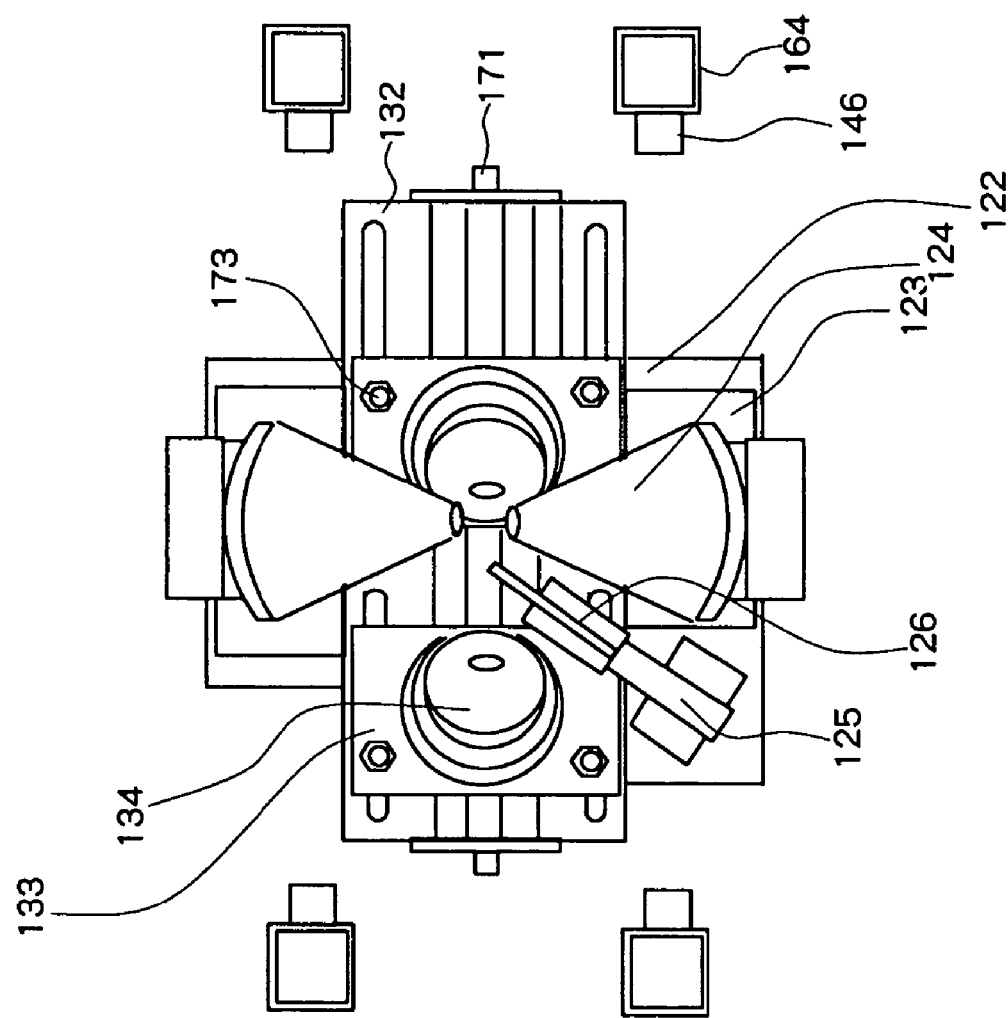
FIG. 9 is a schematic front elevational view of a machining assembly of the steel tube machining apparatus shown in FIG. 8.
Figure 10B:
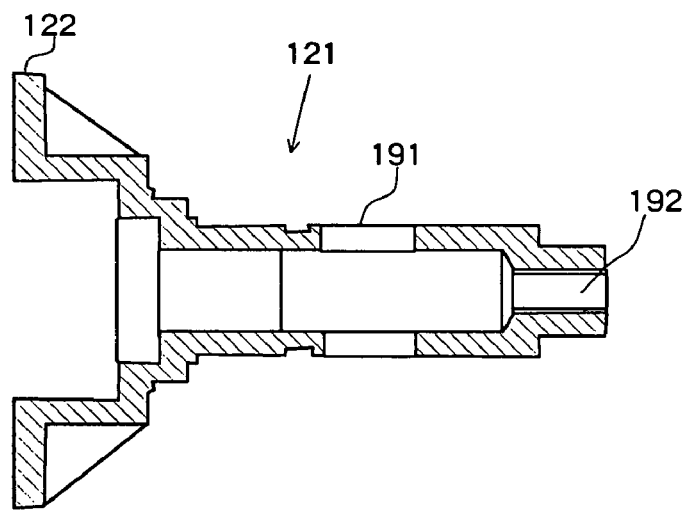
Figure 10C:
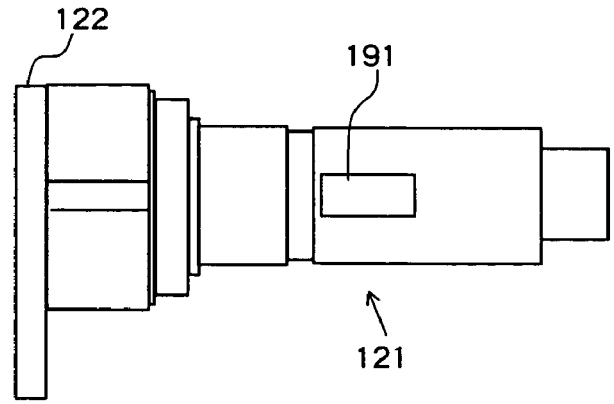

The combined machining equipment for steel tubes according to the second embodiment has flared surface grinding unit 125 in addition to the combined machining equipment for steel tubes according to the first embodiment. Flared surface grinding unit 125 has flared surface grinding cutter 126 supported on its tip end for grinding the end of steel tube 110 which has been pressed and deformed in the flaring process. Flared surface grinding unit 125 is disposed on flared surface grinding unit mount 194 (see FIGS. 10A–10C) adjacent to one of second machining head units 124 which is mounted on a second machining head mount 193 of flange 122 of main shaft 121. As shown in FIG. 8, flared surface grinding unit 125 has flared surface grinding cutter 126 having a cutting edge extending perpendicular to the axis of main shaft 121 and disposed in a position substantially aligned with the surface of steel tube 110 which is contacted by second machining heads 124. Flared surface grinding cutter 126 is slidably mounted on flared surface grinding unit 125 so as to be able to face the end face of steel tube 110 having a diameter in a predetermined range which can be held by steel tube holding apparatus 102. Flared surface grinding unit 125 is held by spring 127 for pressing flared surface grinding cutter 126 against the surface of steel tube 110 which is contacted by second machining heads 124, and is mounted in support hole 128 defined in flange 122. The cutting edge of flared surface grinding unit 125 is oriented to grind the end face of steel tube 110 when the main shaft is rotated in a direction that is opposite to the direction in which it is rotated for second machining heads 124 to machine steel tube 110. While second machining heads 124 is machining machine steel tube 110, flared surface grinding unit 125 turns simply in resilient contact with the end of steel tube 110. When the machining of steel tube 110 with second machining heads 124 is finished and main shaft 121 is rotated in the opposite direction, flared surface grinding unit 125 grinds the end of steel tube 110 which has been pressed and deformed by second machining heads 124. If a steel tube, such as a stainless steel tube, does not need to be ground, then flared surface grinding unit 125 may be removed from flange 122. When steel tube 110 is positioned, flared surface grinding unit 125 may be retracted outwardly of second machining heads 124 for protection of the cutting edge.

A flared surface grinding process that is performed using the combined machining equipment for steel tubes according to the second embodiment of the present invention, in combination with the flaring process according to the first embodiment, will be described below with reference to a flowchart of FIG. 11 which illustrates an operation sequence of the combined machining equipment for steel tubes according to the first and second embodiments.

When a machining process is started (S101), clamp chuck 151 matching the dimensions of steel tube 110 is installed on clamp chuck guides 152 (S102), and a limit switch position is set depending on the dimensions of steel tube 110 (S103).

Slide screw nuts 172 on the lower surface of first machining head units 133 are moved by slide screws 171 on first machining head mount base 132. First machining heads 134 are positionally set to a position corresponding to the dimensions of steel tube 110, and then fixed in that position by fixing screws 173. Flared surface grinding cutter 126 is positionally adjusted to a machining position corresponding to the dimensions of steel tube 110 (S104).

Auxiliary shaft 131 is retracted (S105), and main shaft 121 is moved forwardly until the side edges of the tip ends of second machining heads 124 reach a machining start position (S106). The tip end of steel tube 110 is brought into abutment against the side edges of the tip ends of second machining heads 124 (S107), and first hydraulic cylinders 159 are operated to secure steel tube 110 to clamp chuck 151 (S108).

When a machining start switch is turned on (S109), main shaft 121 is retracted to its rearmost position, and auxiliary shaft 131 is moved forwardly to its foremost position (S110). Then, main shaft 121 is moved forwardly while in rotation, causing first machining heads 134 to spread the tip end of steel tube 110 (S111). If main shaft 121 is moved forward until the tip end of steel tube 110 is spread to the first position (S112Y), then main shaft 121 continuously moves forwardly while in rotation, and auxiliary shaft 131 is retracted to the rearmost position (S113). Second machining heads 124 are brought into contact with the tip end of steel tube 110 which has been spread to the first position (S114). If main shaft 121 is moved forward until the tip end of steel tube 110 is spread to the flanged position (S115Y), main shaft 121 is stopped against rotation and forward movement (S116). The above process up to present is the flaring process according to the first embodiment.

Then, main shaft 121, as it is held at rest, is rotated in the opposite direction (S117), and the cutting edge of flared surface grinding cutter 128 contacts and grinds the tip end of steel tube 110 which has been spread to the flanged position (S118). After a predetermined period of time elapses (S119Y), main shaft 121 is stopped against rotation and retracted to the rearmost position (S120). This process is the flared surface grinding process according to the second embodiment.

Then, first hydraulic cylinders 159 are actuated to release steel tube 110 from clamp chuck 151. (S121). Steel tube 110 is then removed from clamp chuck 151 (S122), whereupon the machining operation is finished. If the machining operation is to be repeated (S123N), then the operation sequence goes back to step S102 to repeat the flaring process and the flared surface grinding process.

The process of spreading and flaring the tip end of a steel tube is also applicable to spreading and flanging the tip end of a structural steel tube, rather than the fastening together of two steel tubes by joining loose flanges.

Figure 12:
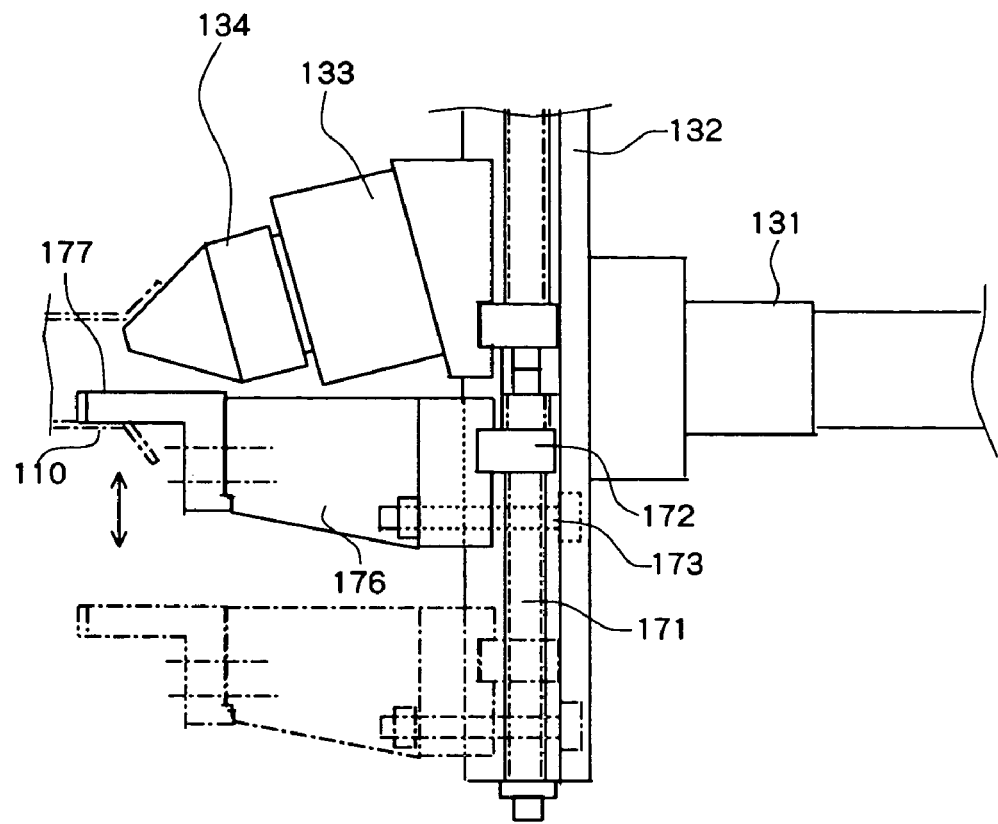
FIG. 12 is a schematic plan view, partly in cross section, of a steel tube machining apparatus of a combined machining equipment for steel tubes according to a third embodiment of the present invention.

A combined machining equipment for steel tubes according to a third embodiment of the present invention will be described below with reference to FIG. 12. According to the third embodiment, the combined machining equipment has a flexure prevention machining head unit that can be installed as an attachment in place of the pair of first machining head units according to the first embodiment.

When the end of steel tube 110 is flanged by first machining heads 134 and second machining heads 124, if steel tube 110 is a thin-walled steel tube such as a stainless steel tube, then the inner surface of steel tube 110 close to the flanged end may be flexed to bulge inwardly.

Flexure prevention head unit 176 can replace each of first machining head units 133, and has flexure prevention head 177 for contacting the inner surface of steel tube 110 to prevent steel tube 110 from being flexed inwardly. Flexure prevention head 177 is of a cylindrical shape parallel to the axis of main shaft 121. When mounted on first machining head mount base 132, flexure prevention head 177 has its tip end projecting into steel tube 110 beyond the tip end of first machining head 134.

Flexure prevention head unit 176 is mounted on first machining head mount base 132 in place of one of two first machining head units 133, and slide screw nut 172 on the lower surface of flexure prevention head unit 176 is moved by slide screw 171 on first machining head mount base 132 so that a side edge of cylindrical flexure prevention head 177 is held against the inner surface of the tip end of steel tube 110. After flexure prevention head unit 176 is positionally adjusted, it is fixed in position by fixing screws 173. Thereafter, the tip end of steel tube 110 is spread by first machining head 134, and pressed and deformed to the flanged position by second machining heads 124. Therefore, the inner surface of steel tube 110 near the flanged end thereof is prevented from being flexed inwardly.

Flexure prevention head 177 is arranged such that it remains in contact with the inner surface of steel tube 110 even when auxiliary shaft 131 is retracted upon transition from the machining process performed by first machining head 134 to the machining process performed by second machining heads 124. Structural and operational details of the combined machining equipment other than flexure prevention head unit 176 are the same as those of the combined machining equipment according to the first embodiment, and will not be described below.

Figure 13:
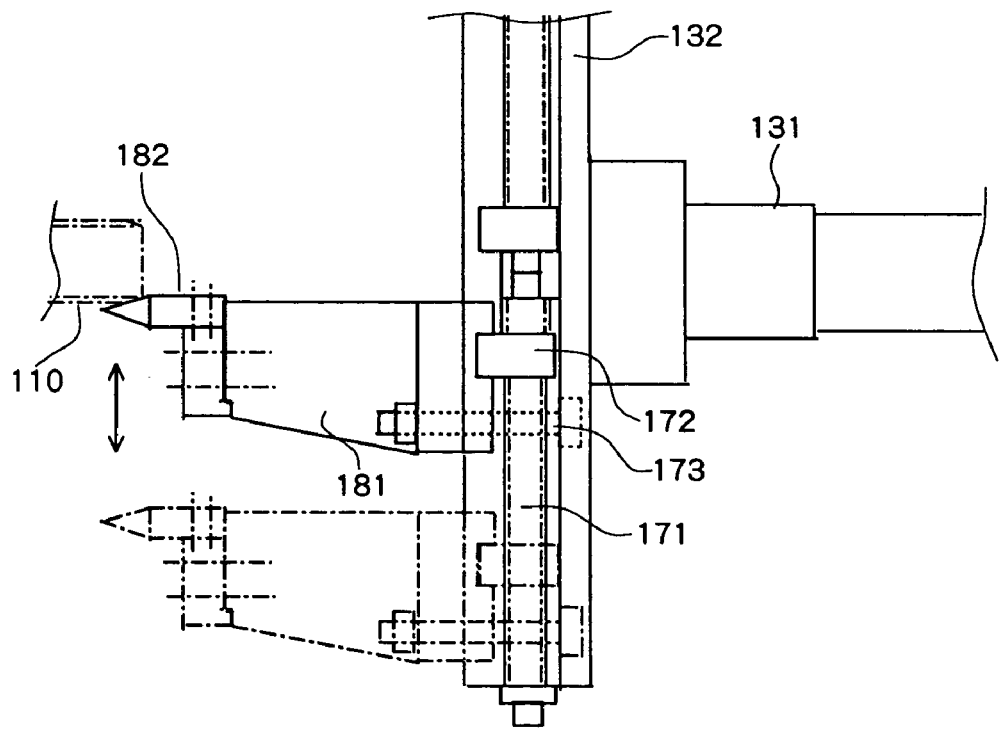
FIG. 13 is a schematic partial plan view of a machining assembly of a combined machining equipment for steel tubes according to a fourth embodiment of the present invention.

A combined machining equipment for steel tubes according to a fourth embodiment of the present invention will be described below with reference to FIG. 13. According to the fourth embodiment, the combined machining equipment has a groove machining head unit having a welding groove machining head that is added as an attachment to the first embodiment.

Groove machining head unit 181 having groove machining head 182 can replace each of first machining head units 133, and can be mounted on first machining head mount base 132 in place of first machining head unit 133. Groove machining head unit 181 has groove machining head 182 with a predetermined grooving angle.

Groove machining head unit 181 is mounted on first machining head mount base 132 in place of one of first machining head units 133, and slide screw nut 172 on the lower surface of groove machining head unit 181 is moved by slide screw 171 on first machining head mount base 132 so that a cutting edge of groove machining head 182 is held against the tip end of steel tube 110 which is fastened by clamp chuck 151 in order to be grooved. After groove machining head unit 181 is positionally adjusted, it is fixed in position by fixing screws 173. Auxiliary shaft 131 is moved to its foremost position with respect to main shaft 121, and main shaft 121 is moved forwardly while in rotation, causing groove machining head 182 to groove the end of steel tube 110.

Structural and operational details of the combined machining equipment other than groove machining head unit 181 are the same as those of the combined machining equipment according to the first embodiment, and will not be described below.

Figure 14:
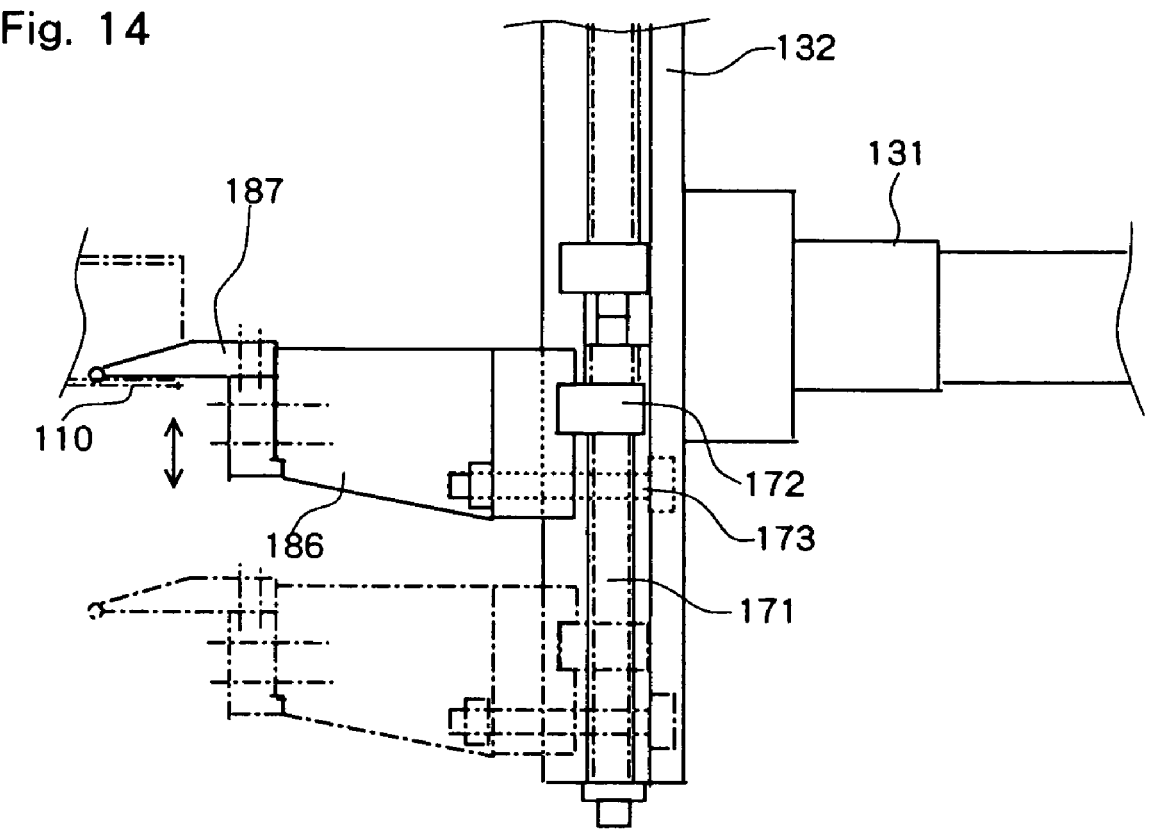
FIG. 14 is a schematic partial plan view of a machining assembly of a combined machining equipment for steel tubes according to a fifth embodiment of the present invention.

A combined machining equipment for steel tubes according to a fifth embodiment of the present invention will be described below with reference to FIG. 14. According to the fifth embodiment, the combined machining equipment has a head unit for removing lining having a lining peeling head that is added as an attachment to the first embodiment.

Lining peeling head unit 186 having lining peeling head 187 can replace each of first machining head units 133, and can be mounted on first machining head mount base 132 in place of first machining head unit 133. Lining peeling head unit 186 has lining peeling head 187 with a tip end having a predetermined shape. It is desirable that the shape of the tip end be round.

Lining peeling head unit 186 is mounted on first machining head mount base 132 in place of one of first machining head units 133, and slide screw nut 172 on the lower surface of Lining peeling head unit 186 is moved by slide screw 171 on first machining head mount base 132 so that the tip end of lining peeling head 187 is held against the inner surface of the tip end of steel tube 110 to be flared which is fastened by clamp chuck 151 for peeling off the lining on its inner surface. After head unit for removing lining 186 is positionally adjusted, it is fixed in position by fixing screws 173. Auxiliary shaft 131 is moved to its foremost position with respect to main shaft 121, and main shaft 121 is moved forwardly while in rotation, causing lining peeling head 187 to peel off the lining on the inner surface of the tip end of steel tube 110.

While head unit for removing lining 186 is described as a head unit for peeling off the lining on the inner surface of the steel tube, it can peel off a lining on the outer surface of the steel tube if head unit for removing lining 186 is set such that the tip end of lining peeling head 187 is held against the outer surface of the tip end of steel tube 110 to be flared which is fastened by clamp chuck 151.

After the lining is peeled off and the end of the steel tube is flared, an inner surface rust-resistant covering collar with an O-ring is inserted into the tube surface from which the lining has been peeled off, thereby covering the flared surface and inner and outer tube surfaces for rust resistance.

Structural and operational details of the combined machining equipment other than head unit for removing lining 186 are the same as those of the combined machining equipment according to the first embodiment, and will not be described below.

INDUSTRIAL APPLICABILITY

The combined machining equipment for machining a steel tube and the method of machining a steel tube according to the present invention allow the ends of steel tubes to be easily machined in various machining processes on site for piping installations, and are useful as machining equipment for piping installations. The combined machining equipment and the machining method can also be used to spread and flange the ends of steel tubes as structural members.

DESCRIPTION OF REFERENCE NUMERALS

100 combined machining equipment
101 steel tube machining apparatus
102 steel tube holding apparatus
103 common mount
110 steel tube
115 loose flange
121 main shaft
122 flange
123 second machining head unit
124 second machining head
125 flared surface grinding unit
126 flared surface grinding cutter
127 spring
129 drive motor
131 auxiliary shaft
132 first machining head mount base 133 first machining head unit
134 first machining head
126 pressure frame
137 cotter slide unit
138 cotter for sliding auxiliary shaft
139 third hydraulic cylinder
141 slide frame
142 front slide frame
143 back slide frame
144 tie rod
145 slider
146 guide rail
147 first main bearing
148 second main bearing
149 second hydraulic cylinder
151 clamp chuck
152 clamp chuck guide
153 tightening rod
154 clamp beam
159 first hydraulic cylinder
162 front frame
163 back frame
164 side frame
165 base frame
166 motor
167 hydraulic unit
168 control console
171 machining head slide screw
172 slide screw nut
173 fixing screw
176 flexure prevention machining head unit
177 flexure prevention machining head
181 groove machining head unit
182 groove machining head
186 head unit for removing lining
187 lining peeling head
191 cotter groove
192 drive motor mount
193 second machining head mount
194 flared surface grinding unit mount

The invention claimed is:

1. A combined machining equipment for steel tubes, having a steel tube machining apparatus for machining an end of a steel tube with replaceable machining heads, a steel tube holding apparatus having a replaceable clamp chuck for gripping an outer surface of said steel tube from opposite sides and holding the steel tube in a machining position, and a common mount, characterized in that said steel tube machining apparatus has a main shaft which is movable reciprocally and rotatable by a drive motor, an auxiliary shaft disposed coaxially with said main shaft and housed in a hollow portion of said main shaft, said auxiliary shaft being fixed against rotation with respect to said main shaft and slidable axially, a flange disposed on a distal end of said main shaft for mounting a machining head thereon, a mount base disposed on a distal end of said auxiliary shaft for mounting a machining head that moves radially thereon, and a slide frame with said main shaft rotatably held thereon;

said common mount holds said slide frame for sliding movement in the axial direction of the main shaft, and firmly interconnecting said steel tube holding apparatus and a second hydraulic cylinder for sliding said slide frame; and the machining heads are mounted on said flange and said mount base for machining the end of said steel tube upon rotation of said main shaft and axial movement of at least one of said main shaft and said auxiliary shaft, wherein said steel tube machining apparatus serves to perform a flaring process to bend the end of said steel tube outwardly into a flange, said steel tube machining apparatus has a first machining head for spreading the end of said steel tube to an intermediate first flanged position and a second machining head for pressing the end of the steel tube which has been spread to the first flanged position to a predetermined flanged position;

said main shaft having the flange on a front end thereof for mounting said second machining head unit thereon, said main shaft having a rear end coupled to a rotational shaft of a drive motor for rotation by said drive motor;

said auxiliary shaft having the mount base on a front end thereof for mounting said first machining head unit thereon to allow said first machining head unit to slide in a direction perpendicular to the central axis of said main shaft, said auxiliary shaft being fitted in an inner bore of said main shaft and said flange for sliding movement along the central axis of said main shaft and rotation in unison with said main shaft; and said slide frame having a front slide frame and a rear slide frame, said main shaft being rotatably held by bearings on the front slide frame and the rear slide frame, said drive motor and an end of a third hydraulic cylinder for sliding said auxiliary shaft with respect to said main shaft being fixed to said rear slide frame, said slide frame having opposing sides and sliders on said side frames which are held in engagement with guide rails of said common mount and slidable along the central axis of said main shaft;

said steel tube holding apparatus comprises a clamp chuck for gripping an outer surface of the steel tube from opposite sides thereof, said clamp chuck replaceable depending on the diameter of said steel tube, said clamp chuck being fixable by a first hydraulic cylinder;

said common mount has a front frame, a rear frame, left and right pairs of side mount frames, and two base frames, said front frame and said rear frame being connected to each other by said left and right pairs of side mount frames and said two base frames, said steel tube holding apparatus being fixed to said front frame, said guide rails which are engaged by said sliders of said slide frame being mounted on said side mount frames, with a second hydraulic cylinder having a front end fixed to said slide frame and a rear end fixed to said rear frame, said base frames supporting thereon a motor, a hydraulic unit, and a control console;

said first machining head comprises a conical roller freely rotatable about its own central axis and is mounted on said mount base of said auxiliary shaft as a first machining head unit held with said central axis tilted on a plane including the axis of said main shaft such that the outer generator on the conical surface which is held in contact with the end face of said steel tube is kept at an angle corresponding to said first flanged position, for sliding movement perpendicular to the axis of said main shaft in order for said generator of said first machining head to face the end face of said steel tube to be machined which has a diameter within a predetermined range, said first machining head being capable of spreading the end of said steel tube held in contact therewith through an angle corresponding to said first position upon forward movement and rotation of said main shaft through said auxiliary shaft when said auxiliary shaft is in a forward position with respect to said main shaft; and said second machining head comprises a conical roller freely rotatable about its own central axis and is mounted on said flange of said main shaft as a second machining head unit held with said central axis tilted on the plane including the axis of said main shaft such that the outer generator on the conical surface which is held in contact with the end face of said steel tube has a length corresponding to the end face of said steel tube to be machined which has a diameter within a predetermined range, and is perpendicular to the axis of said main shaft, said second machining head being capable of pressing and deforming the tip end of said steel tube held in contact therewith to said predetermined flanged position upon forward movement and rotation of said main shaft when said auxiliary shaft is in a retracted position with respect to said main shaft.

2. A combined machining equipment for steel tubes according to claim 1, wherein said drive motor for rotating said main shaft comprises an electric motor with a speed reducer mechanism.

3. A combined machining equipment for steel tubes according to claim 1, further comprising a flared surface grinding unit for grinding the end face of said steel tube which is pressed and deformed by said flaring process, said flared surface grinding unit being disposed on said flange of said main shaft adjacent to said second machining head unit, and having a flared surface grinding cutter slidable depending on a change in the diameter of said steel tube, said flared surface grinding cutter having a cutting edge extending perpendicularly to the axis of said main shaft and substantially aligned with the surface of said steel tube which is contacted by said second machining head, said flared surface grinding unit being held by a spring and mounted in a support hole defined in said flange, wherein said cutting edge of said flared surface grinding cutter is held in contact with the end of said steel tube which is pressed and deformed by said second machining head to grind the deformed end of said steel tube upon rotation of said main shaft in a predetermined direction.

4. A combined machining equipment for steel tubes according to claim 1, wherein the mount base of said first machining head unit includes two mount bases facing each other across said axis in a diametrical direction of the flange of said main shaft, further comprising a flexure prevention machining head unit mounted in place of said first machining head unit on one of said mount bases, said flexure prevention machining head unit having a flexure prevention machining head disposed on a distal end thereof and having a cylindrical shape parallel to the axis of said main shaft, wherein while said flexure prevention machining head unit is positionally adjusted on said mount base to keep a side edge of the cylindrical flexure prevention machining head in contact with an inner surface of the end of the steel tube to be flared, the tip end of said steel tube is spread by said first machining head and pressed and deformed to the flanged position by said second machining head, for thereby preventing the inner surface of the steel tube close to the flanged end thereof from being flexed inwardly.

5. A combined machining equipment for steel tubes according to claim 1, further comprising a groove machining attachment mounted on said mount base of said auxiliary shaft for machining a welding groove in the tip end of said steel tube, said groove machining attachment having a groove machining tool disposed on a distal end thereof and having an inclined cutting edge on a distal end thereof, wherein while said groove machining attachment is positionally adjusted on said mount base to keep said cutting edge in contact with the tip end of the steel tube fixed to a clamp chuck, said main shaft is rotated and moved forwardly to cause said cutting edge to cut the tip end of said steel tube to form a groove therein.

6. A combined machining equipment for steel tubes according to claim 1, further comprising a lining cutting attachment mounted on said mount base of said auxiliary shaft for peeling off a lining attached to inner and outer surfaces of the steel tube, said lining cutting attachment having a lining cutting cutter disposed on a distal end thereof and having a cutting edge disposed on either an inner surface or an outer surface thereof parallel to the axis of said main shaft, wherein while said lining cutting attachment is positionally adjusted on said mount base to keep said cutting edge of the lining cutting cutter in contact with either the inner surface or the outer surface of said steel tube, said main shaft is rotated and moved forwardly to cause said cutting edge to peel off the lining on said steel tube.

7. A method of machining a steel tube by performing a flaring process to bend an end of the steel tube outwardly to form a flange thereon perpendicularly to a central axis of the steel tube, using a combined machining equipment for steel tubes, so that ends of two steels can be fastened to each other by joining loose flanges having inner surfaces slidable along outer wall surfaces of the steel tubes, comprising the steps of:

fixing the steel tube to be machined in a predetermined position in said combined machining equipment with a clamp chuck of a steel tube holding apparatus such that the central axis of the steel tube is aligned with a central axis of a main shaft;

fixing a pair of first machining heads in a position, corresponding to a machining position, on a mount base disposed on a distal end of an auxiliary shaft which is slidable back and forth with respect to the main shaft and fixed against rotation with respect to the main shaft, said first machining head comprising a freely rotatable conical roller mounted on said mount base, said conical roller having a conical surface having a generator kept at an angle corresponding to a first machined position;

moving forwardly said auxiliary shaft to a foremost position with respect to said main shaft, and moving forwardly said main shaft while in rotation to cause said first machining head to spread the end of said steel tube to said first machined position;

retracting said auxiliary shaft to a rearmost position with respect to said main shaft, and moving forwardly said main shaft while in rotation to cause a second machining head, which comprises a freely rotatable conical roller mounted on a flange on a distal end of said main shaft, with a generator perpendicular to the axis of said main shaft, to press and deform the end of said steel tube to a predetermined flanged angle;

opening said clamp chuck of said steel tube holding apparatus to remove said steel tube which has been flared;

replacing one of two sets of first machining heads on said first machining head mount base with a flexure prevention machining head unit having a flexure prevention machining head on a distal end thereof which is of a cylindrical shape parallel to the axis of said main shaft; and positionally adjusting said flexure prevention machining head unit on said first machining head mount base to bring a side edge of the cylindrical flexure prevention machining head into contact with an inner surface of the end of the steel shaft to be flared;

wherein said end of the steel shaft is flared while the side edge of the cylindrical flexure prevention machining head is held in contact with the inner surface of the end of the steel shaft to be flared.

8. A method of machining a steel tube according to claim 7, further comprising the step of:

after the end of said steel tube is pressed and deformed to said predetermined flanged angle by said second machining head, rotating said main shaft in an opposite direction to rotate a flared surface grinding cutter in a grinding direction to grind the end face of said steel tube which has been flared, said flared surface grinding cutter being disposed on the flange of said main shaft adjacent to said second machining head unit and having a cutting edge extending perpendicularly to the axis of said main shaft and substantially aligned with the surface of said steel tube which is contacted by said second machining head, said cutting edge being pressed toward said steel tube.

9. A method of machining a steel tube according to claim 7, further comprising the steps of:

replacing one of two sets of first machining heads on said first machining head mount base with a flexure prevention machining head unit having a flexure prevention machining head on a distal end thereof which is of a cylindrical shape parallel to the axis of said main shaft; and positionally adjusting said flexure prevention machining head unit on said first machining head mount base to bring a side edge of the cylindrical flexure prevention machining head into contact with an inner surface of the end of the steel shaft to be flared;

wherein said end of the steel shaft is flared while the side edge of the cylindrical flexure prevention machining head is held in contact with the inner surface of the end of the steel shaft to be flared.

* * * * *